Oct. 25, 1932.                W. E. HENDRIE                1,884,676
                              EDUCATIONAL DEVICE
                              Filed Dec. 20, 1928

| SPEED AND ACCURACY DRILL CARD<br>Subtraction Test A | | | | | | | | | | | Page 1 |
|---|---|---|---|---|---|---|---|---|---|---|---|
| ↑ | ↓ | 1 | 2 | 3 | 4 | 5 | 6 | 7 | 8 | 9 | 10 |
| 90 |    | 7/4 | 12/8 | 17/9 | 7/5 | 14/5 | 8/3 | 9/5 | 16/7 | 15/7 | 9/2 | 1 |
| 80 | 10 | 17/8 | 9/6 | 13/8 | 13/4 | 10/1 | 16/8 | 18/9 | 11/7 | 6/4 | 14/6 | 2 |
| 70 | 20 | 13/5 | 13/7 | 8/4 | 15/8 | 11/4 | 6/2 | 16/8 | 12/5 | 12/3 | 14/9 | 3 |
| 60 | 30 | 7/2 | 13/9 | 14/5 | 13/5 | 15/9 | 11/3 | 12/9 | 8/4 | 16/9 | 13/3 | 4 |
| 50 | 40 | 11/9 | 9/3 | 14/9 | 13/6 | 18/9 | 11/6 | 12/3 | 8/8 | 8/5 | 13/4 | 5 |
| 40 | 50 | 11/2 | 15/7 | 8/0 | 11/9 | 16/9 | 9/4 | 13/9 | 13/8 | 10/4 | 15/6 | 6 |
| 30 | 60 | 10/6 | 11/4 | 17/8 | 12/8 | 14/7 | 17/8 | 10/9 | 14/8 | 14/6 | 8/2 | 7 |
| 20 | 70 | 11/8 | 10/7 | 10/8 | 16/7 | 19/7 | 12/5 | 17/9 | 8/6 | 14/8 | 12/4 | 8 |
| 10 | 80 | 14/5 | 13/6 | 6/3 | 11/3 | 9/8 | 15/9 | 14/8 | 17/9 | 15/6 | 10/2 | 9 |
| 0  | 90 | 15/9 | 11/6 | 13/5 | 12/7 | 12/9 | 13/7 | 12/6 | 10/3 | 10/6 | 14/9 | 10 |
| a | b | | | | | | | | | | | |
|   |   | c | 10 | 20 | 30 | 40 | 50 | 60 | 70 | 80 | 90 | → |
|   |   | d | 90 | 80 | 70 | 60 | 50 | 40 | 30 | 20 | 10 |   | ← |

*Fig. 1*

| Subtraction Test A<br>Answers | | | | | | | | | | | Page 2 |
|---|---|---|---|---|---|---|---|---|---|---|---|
| ↑ | ↓ | 1 | 2 | 3 | 4 | 5 | 6 | 7 | 8 | 9 | 10 |
| 90 |    | 3 | 4 | 8 | 2 | 9 | 5 | 4 | 9 | 8 | 7 | 1 |
| 80 | 10 | 9 | 3 | 5 | 9 | 9 | 8 | 9 | 4 | 2 | 8 | 2 |
| 70 | 20 | 8 | 6 | 4 | 7 | 7 | 4 | 8 | 7 | 9 | 5 | 3 |
| 60 | 30 | 5 | 4 | 9 | 8 | 6 | 8 | 3 | 4 | 7 | 10 | 4 |
| 50 | 40 | 2 | 6 | 5 | 7 | 9 | 5 | 9 | 0 | 3 | 9 | 5 |
| 40 | 50 | 9 | 8 | 8 | 2 | 7 | 5 | 4 | 5 | 6 | 9 | 6 |
| 30 | 60 | 9 | 8 | 8 | 2 | | | | | | | 7 |

Inventor:
William E. Hendrie.
by Wright Brown Quinby & May
Att'ys.

Patented Oct. 25, 1932

1,884,676

UNITED STATES PATENT OFFICE

WILLIAM E. HENDRIE, OF GREENLAWN, NEW YORK

EDUCATIONAL DEVICE

Application filed December 20, 1928. Serial No. 327,354.

This invention relates to educational devices for providing in compact and convenient form a relatively large number of simple exercises or problems together with means for determining readily the speed and accuracy percentages of the pupil.

For a more complete disclosure of the invention, reference may be had to the description which follows and to the drawing, of which,—

Figure 1 represents the obverse face of a card or sheet embodying the invention.

Figure 2 represents a folded strip of paper for use with the card shown in Figure 1.

Figure 3 represents the reverse face of the card illustrated in Figure 1, the folded paper being shown in position for use.

Referring to the drawing in detail, 10 represents a printed sheet which may be a card, a page of a book, or any other flat element adapted to receive printing. On the obverse face of the card are arranged a number of problems 11. These problems as shown may be arranged in a square array of rows and columns, the rows and columns being preferably of equal difficulty of solution. In the illustration shown on the drawing the problems are arithmetical subtraction problems, but it is obvious that other similar arithmetical operations may be employed and problems may include other subject matter which is capable of presentation in compact form. In order to facilitate the calculation of percentages of work done, I preferably provide one hundred problems for each sheet or card, these problems being arranged in ten rows and ten columns. The individual problems may be separated as by suitable lines 12 extending vertically and horizontally between the columns and rows.

I also may provide a suitable sheet 13 of blank paper which is preferably folded as shown in Figure 2 or is provided with means for facilitating successive folds in the same direction, such means comprising parallel lines of water-marks, perforations, indentations, creases, or the like, these lines being spaced apart approximately the same distance as successive lines 12 on the sheet, the spacing increasing slightly with the number of folds. In using the problem side of the sheet, the pupil may place the unfolded strip 13 over the card with the top edge even with the upper ends of the vertical lines 12 on the sheet, thus covering all the problems on the sheet. When the signal to start is given by the teacher, the pupil folds the upper portion of the paper strip on the first line of fold. This exposes the first row of problems and turns up a narrow rectangle of the under face of the strip to receive the answers to the first row of problems immediately below the problems themselves. The pupil proceeds to solve the first-row problems and to write the answers on the upturned face. When the first row is completed, the strip is again folded downwardly on the second line of fold, exposing the second row of problems and turning up another portion of the under face of the strip to receive the answers. As each row of problems is completed, the strip is folded again to expose the next succeeding row and the work is continued, each row being worked from left to right, until at the end of a predetermined interval the teacher gives the signal to stop. At this point the pupil notes the last problem solved at this moment and observes the index number to the left of the row in which the last solved problem lies and the index number at the top of the column which contains the last solved problem. The sum of these figures gives the speed percentage of the pupil, since this sum represents the number of problems which have been solved out of the total of one hundred to be solved. For example, if, when the stop signal is given, the pupil has just solved the problem indicated as 14, working down the sheet as hereinbefore described, his speed percentage is 57.

In order to permit frequent use of the cards without involving a conscious or unconscious memorization of the answers to the problems by rote on the part of the pupil, the order of solving the problems may be changed. Instead of starting at the top, as described, the pupil may place a folded strip 13 of blank paper just below the lowest row of problems, the paper having been previously folded at least ten times, preferably in the same direction. When the starting signal is given the pupil solves the bottom row of problems from left to right, then turns the folded portion of the paper strip upward so that the bottom row of problems is covered and a fresh space is provided in which to write the answers to the row of problems next to the bottom. This process is repeated until the signal to stop is given. If at this time the pupil has just completed the problem indicated at 14, the speed percentage is 47. In order to facilitate a rapid determination of these speed percentages, separate columns of multiples of 10 are provided in the left hand margin of the sheet, one of these columns being for use when the pupil works from the top row down, the other being for use when the pupil works from the bottom row up. In order to avoid the use of the wrong column in obtaining the speed percentage, suitable additional indicia, such as arrows 15, may be employed to indicate the column of index figures to be used when working in the direction indicated by the arrow. Since the normal horizontal direction of work is always from left to right, the index units above the columns of problems need not be reversed.

If desired, instead of starting at the top of the card with an unfolded strip 13, a folded strip may be used, the strip being initially held so as to cover the topmost row of problems. At the starting signal the strip is slid downwardly on the card to expose the first row of problems which are thereupon solved from left to right, the answers being written on the fold of the strip. The strip is then unfolded once upwardly and slid down until the second row of problems is exposed, the answers to these problems being written on the freshly exposed surface of the strip. This is continued row after row until the stopping signal is given. The percentage is found from the marginal numerals as hereinbefore described. In like manner, the pupil may start with an unfolded strip 13 in working the card from the bottom up. In this case the unfolded strip is placed on the card so that its upper edge covers the bottom row of problems. When the starting signal is given, the strip is folded downwardly to expose the bottom row of problems which are thereupon solved. Then the strip is again folded downwardly and is slid up on the face of the card until its upper edge is just below the next to the bottom row of problems. When these are solved, the paper strip is again folded downwardly and slid upwardly, and so on until the stopping signal is given.

The problems on the sheet may also be solved in successive columns instead of successive rows, the columns being used from left to right or from right to left. In solving by columns an unfolded paper strip 13 may be laid on the sheet 10 with its lines of fold vertical so that the end of the sheet lies even with the right hand ends of the horizontal lines 12. Starting, for example, with a fold to expose the right hand column, the pupil solves the problems therein from top to bottom, then folds the strip again to expose the second column, the problems of which are thereupon solved from top to bottom. Or, a folded strip 13 may be placed adjacent to the right-hand column, the strip being unfolded once and slid toward the left each time a column is finished to expose the next column and a fresh surface of paper for the answers. When the signal to stop is given the pupil notes his percentage from the light faced type at the bottom and right hand edge of the card. If, for example, the last problem solved is number 14 his speed percentage is 36, the arrows being used as in the vertical columns to indicate which set of index numbers at the bottom of the sheet should be used. If the pupil is directed to start with the left hand column, a folded or unfolded strip of paper may be used, the strip being manipulated after each column has been solved, to cover that column and to expose a fresh surface of paper alongside the next column. If, when solving in this manner, the last problem to be solved is, for example, that indicated at 14, the pupil's speed percentage is 66, this figure being instantly obtained from the light row of figures at the bottom of the sheet indicated by the arrow pointed in the direction of progress and the light figure opposite this problem in the right hand margin of the sheet. After the speed percentage has been noted by the pupil, the remainder of the one hundred problems may be solved and the answers written on the folded strip 13.

In order to check the work for accuracy, a set of answers to the problems is provided on the reverse side of the card or on another page of the book. These answers are arranged and spaced in the same manner as the problems so that the folded strip of paper may be placed directly underneath a row or beside a column of answers so that the comparison between the pupil's answers and the correct printed answers can be made at a glance, as shown in Figure 3. After comparing each row or column of answers with the answers on the strip, the strip is thereupon folded or unfolded according to the direction of progression so as to present the next row or column of answers for comparison. In this way the number of mistakes may be easily and quickly noted, this number being subtracted from 100 to give the accuracy percentage of the pupil's work. In the margin of the sheet containing the answers may be printed index numbers similar to those on the problem sheet, and similarly arranged with respect to the rows and columns of answers. This facilitates accurate placing of a strip of paper containing answers when the work is stopped before the entire number of problems has been completed, or the location of the answer of any particular problem.

In order to aid the teacher or superior to make sure that all the scholars of a large class are actually solving the problems and not merely copying the answers, the cards may have different colors on their opposite faces, or the printing on the two faces may be with different colored inks, or contrasting shades of the same color, or conspicuous markings may be made on one of the faces so that it can be distinguished from the other face at a glance from a considerable distance. By way of example, convenient areas such as 16 on, say, the answer side of the card may be black or of a contrasting color so that the card is made conspicuous when its answer side is up. The conspicuous markings could just as well be made on the problem side of the card instead of the answer side.

Having thus described an embodiment of this invention, it should be evident to those skilled in the art that various changes and modifications might be made therein without departing from its spirit or scope as defined by the appended claims.

I claim:

1. A problem sheet having one hundred problems printed on one face thereof in square array of ten rows and ten columns, said sheet having the answers to said problems printed on the reverse face thereof, the arrangement and spacing of the answers being substantially identical with the arrangement and spacing of the problems whereby fresh portions of a blank paper strip with successive folds may be placed in juxtaposition successively with the several rows or columns, to receive the written solutions of the problems and may be subsequently placed in juxtaposition successively with the several rows or columns of printed answers for direct comparison, and marginal percentage data extending in parallel spaced rows vertically of one side of the sheet and longitudinally of one end of the sheet and in alignment with the rows and columns whereby the percentage of problems solved be determined upon inspection when the problems are worked upwardly or downwardly of the rows or from left to right or right to left of the columns.

2. A problem sheet having one hundred problems printed on one face thereof in square array of ten rows and ten columns, said sheet having the answers to said problems printed on the reverse face thereof, the arrangement and spacing of the answers being substantially identical with the arrangement and spacing of the problems whereby fresh portions of a blank paper strip with successive folds may be placed in juxtaposition successively with the several rows or columns to receive the written solutions of the problems and may be subsequently placed in juxtaposition successively with the several rows or columns of printed answers for direct comparison and percentage data extending in parallel spaced rows in inverted order to each other, on one side of the sheet and in alignment with the problems whereby the percentage of problems solved may be determined by inspection.

In testimony whereof I have affixed my signature.

WILLIAM E. HENDRIE.